(12) United States Patent
Chiao

(10) Patent No.: US 7,237,050 B2
(45) Date of Patent: Jun. 26, 2007

(54) MULTI-CHANNEL SERIAL ADVANCED TECHNOLOGY ATTACHMENT CONTROL SYSTEM AND CONTROL CARD THEREOF

(75) Inventor: Chung-Hua Chiao, Taipei (TW)

(73) Assignee: Inventec Corporation, Taipei (TW)

( * ) Notice: Subject to any disclaimer, the term of this patent is extended or adjusted under 35 U.S.C. 154(b) by 181 days.

(21) Appl. No.: 11/080,505

(22) Filed: Mar. 16, 2005

(65) Prior Publication Data
US 2006/0212641 A1   Sep. 21, 2006

(51) Int. Cl.
*G06F 13/00* (2006.01)
(52) U.S. Cl. .............. 710/113; 710/240; 710/314; 711/112; 711/147
(58) Field of Classification Search ............ None
See application file for complete search history.

(56) References Cited

U.S. PATENT DOCUMENTS 7,039,737 B1 *  5/2006  Dorr et al. ............. 710/240
2004/0267754 A1 * 12/2004  Aono ....................... 707/9
2005/0027900 A1 *  2/2005  Pettey ..................... 710/22
2005/0108452 A1 *  5/2005  Loffink ................... 710/74
2005/0166018 A1 *  7/2005  Miki ...................... 711/117
2005/0177683 A1 *  8/2005  Isobe et al. ............. 711/114
2005/0251588 A1 * 11/2005  Hoch et al. ............... 710/5
2006/0059408 A1 *  3/2006  Chikusa et al. ......... 714/770

* cited by examiner

*Primary Examiner*—Glenn A. Auve
(74) *Attorney, Agent, or Firm*—Rabin & Berdo, P.C.

(57) ABSTRACT

A multi-channel serial advanced technology attachment (SATA) control system and control card thereof includes a first SATA control module, a first access-grant arbitration unit, a second SATA control module, a second access-grant arbitration unit and a path selection module. Through an arbitration process performed in the first and second access-grant arbitration units, an access-grant is determined. And a selection signal is generated based on the process result that is sent to the path selection module, to switch a transmission path to the SATA control module which has acquired the access-grant. Therefore, multi-channel SATA data access function may be achieved.

17 Claims, 2 Drawing Sheets

MULTI-CHANNEL SERIAL ADVANCED TECHNOLOGY ATTACHMENT CONTROL SYSTEM AND CONTROL CARD THEREOF

FIELD OF THE INVENTION

The present invention relates to a hard disk interface control system and particularly to a multi-channel serial advanced technology attachment (SATA) control system for use in a storage area network (SAN) system.

BACKGROUND OF THE INVENTION

With the arrival of the information age many enterprises employ SAN systems to resolve important information management and storage problems. A SAN system is a network architecture consisting of storage equipment and is managed by a server linking to a local area network (LAN). When data is destroyed, the SAN system can provide remedy measures to restore the data to the condition before the destruction occurred. Thereby the reliability and stability of computer systems can be enhanced.

In general, the transmission interface of the storage equipment (such as hard disks) being used mostly adopts the Small Computer System Interface (SCSI). Although the hard disk equipped with SCSI can transmit data at high speed, for medium and small businesses, the SAN system is too expensive and not affordable.

Hence the hard disk equipped with a SATA transmission interface is a preferable choice. Data transmission speed of the SATA transmission interface is slightly slower than the SCSI, but its setup cost can meet the requirements of the medium and small businesses. Nevertheless, the SATA transmission interface provides only a single channel interface specification. This is not adequate for the SAN system as far as the transmission channel is concerned.

Hence, to provide a multi-channel SATA interface data access control system to reduce the cost of storage array network systems is one of the key focuses in the industry.

SUMMARY OF THE INVENTION

In view of the aforesaid disadvantages and problems, the primary object of the present invention is to provide a multi-channel SATA control system and control card that has an access-grant arbitration process to enable a SATA control module which has acquired the access-grant, to perform data access operation on a hard disk to achieve multi-channel SATA data access function.

In order to achieve the foregoing object, the multi-channel SATA control system according to the invention aims to control data access of a hard disk. It includes a first SATA control module, a first access-grant arbitration unit, a second SATA control module, a second access-grant arbitration unit and a path selection module.

The first SATA control module aims to control data access of the hard disk. The first SATA control module includes a first network transmission unit, a first access-grant arbitration unit, a first hard disk control unit, a first control chip set unit, and a first microprocessor unit.

The first network transmission unit to connect the first SATA control module to a LAN to transmit or receive related data and control commands. The first network transmission unit includes a first Ethernet port.

The first access-grant arbitration unit located in the first SATA control module. It may be a field programmable gate array (FPGA) or a complex programmable logic device (CPLD), or other programmable planning logic elements.

The first hard disk control unit to receive data from the LAN and perform data access operation on the hard disk after access-grant is acquired, and has been connected to the path selection module through a SATA interface.

The first control chip set unit connecting to the first network transmission unit and the first hard disk control unit to control their circuit operation.

The first microprocessor unit connecting to the first control chip set unit to process signals of the first control chip set unit.

The second SATA control module aims to control data access of the hard disk. It includes a second network transmission unit, a second access-grant arbitration unit, second hard disk control unit, a second control chip set unit, and a second microprocessor unit.

The second network transmission unit to connect the second SATA control module to the LAN to transmit or receive related data and control commands. The second network transmission unit includes a second Ethernet port.

The second access-grant arbitration unit located in the second SATA control module, connecting to the first access-grant arbitration unit, to determine access-grant of the hard disk data through an arbitration process, and generate a selection signal based on the process result. It may be a field programmable gate array (FPGA) or a complex programmable logic device (CPLD), or other programmable planning logic elements.

The second hard disk control unit to receive data from the LAN and perform data access operation on the hard disk after the access-grant is acquired, and has been connected to the path selection module through the SATA interface.

The second control chip set unit connecting to the second network transmission unit and the second hard disk control unit to control their circuit operation.

The second microprocessor unit connecting to the second control chip set unit to process signals of the second control chip set unit.

The path selection module is connected to the first and second SATA control modules. It has a plurality of data transmission channels that are selectively switched according to selection signals to enable the SATA control module which has acquired the access-grant to access data on the hard disk. It may include a multiplexer.

Moreover, to achieve the foregoing object, the invention provides a SATA control card to control data access on the hard disk. It includes a network transmission unit, an access-grant arbitration unit, a hard disk control unit, a control chip set unit, and a microprocessor unit.

The network transmission unit to connect the SATA control card to a LAN to transmit or receive related data and control commands. The network transmission unit includes an Ethernet port.

The access-grant arbitration unit located in the SATA interface control card. It may be a field programmable gate array (FPGA) or a complex programmable logic device (CPLD), or other programmable planning logic elements.

The hard disk control unit to receive data from the LAN, and perform data access operation on the hard disk after access-grant is acquired.

The control chip set unit connecting to the network transmission unit and the hard disk control unit to control their circuit operation.

The microprocessor unit connecting to the control chip set unit to process signals of the control chip set unit.

Furthermore, to achieve the foregoing object, the invention provides a multi-channel SATA control method, which includes the following steps:

first, issue an access request signal to another access-grant arbitration unit; determine the content of a response signal; if the response signal is busy, wait for a preset time period and return to the step of issuing an access request signal to another access-grant arbitration unit; and receive the response signal of an idle condition, indicating access-grant is acquired, and generate a selection signal; next, a path selection unit switches a transmission path according to the received selection signal to the SATA control module which has acquired the access-grant to control data access.

Through the multi-channel SATA control system and the control card, and the access-grant arbitration process, the SATA control module, which has acquired the access-grant, is allowed to perform data read/write operations so that a single channel SATA control card is equipped with a multi-channel data transmission function, thereby the cost of the SAN system may be reduced.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
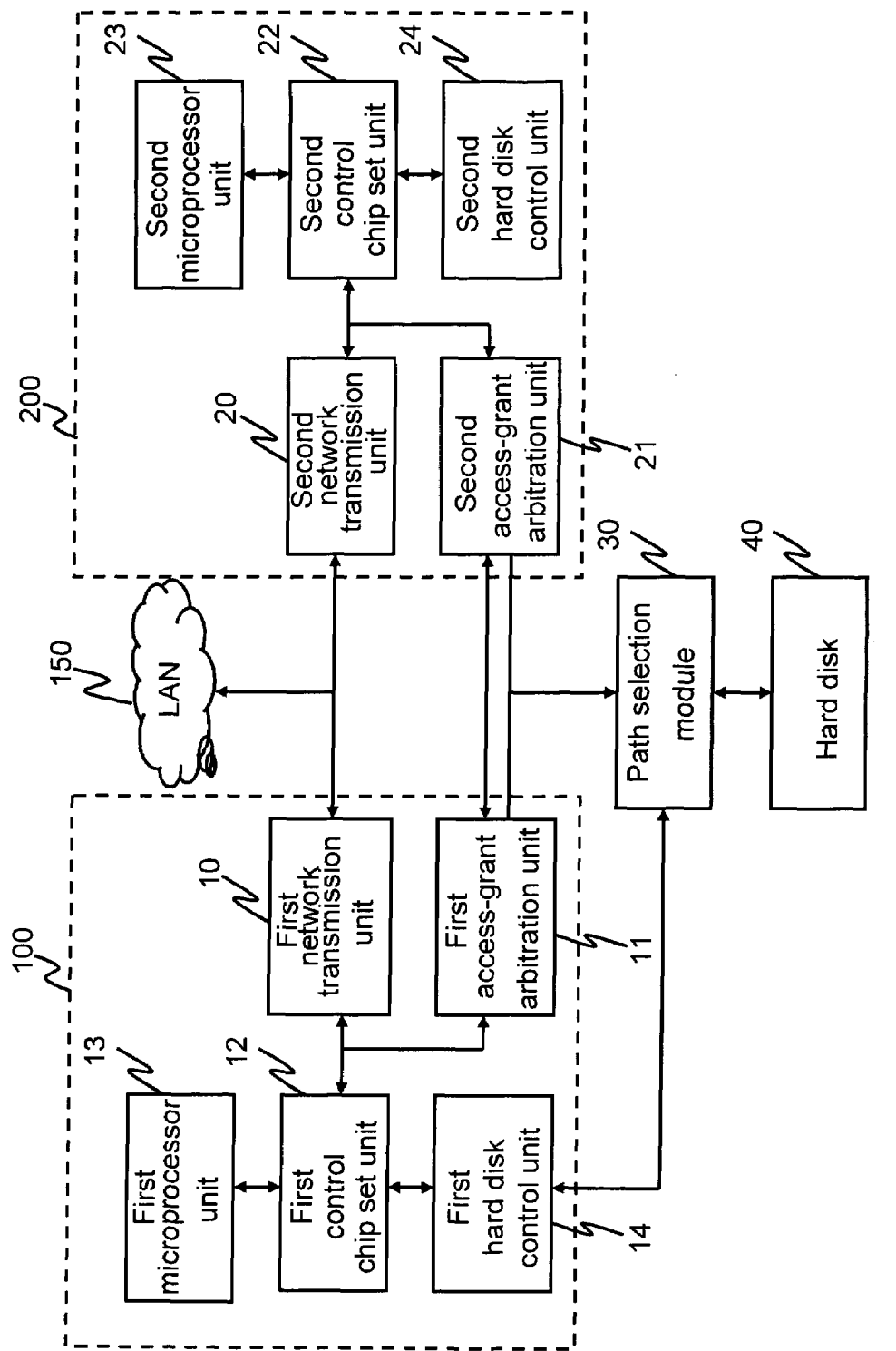
FIG. 1 is the system block diagram of the invention.

Refer to FIG. 1 for the system block diagram of the invention. The system includes a first SATA control module 100, a first access-grant arbitration unit 11, a second SATA control module 200, a second access-grant arbitration unit 21 and a path selection module 30.

The first SATA control module 100 aims to control data access of a hard disk 40 (such as reading or writing). The first SATA control module 100 further includes:

a first network transmission unit 10 to connect the first SATA control module 100 to a LAN 150 to transmit or receive related data and control commands. The first network transmission unit 10 includes a first Ethernet port to link the LAN 150. There is SAN system (not shown in the drawing) to do data management for the hard disk 40 through the LAN 150.

The first access-grant arbitration unit 11 located in the first SATA control module 100. It is connected to the first network transmission unit 10 and the second access-grant arbitration unit 21 to determine access-grant according to received data and commands it functions through an arbitration process, and generates a selection signal based on the process result. And after having acquired the access-grant, the first SATA control module 100 can control data access on the hard disk 40. The first access-grant arbitration unit 11 may be a field programmable gate array (FPGA) or a complex programmable logic device (CPLD), or other programmable planning logic elements.

A first control chip set unit 12 connecting to the first network transmission unit 10 to control circuit operation of the first network transmission unit 10 and a first hard disk control unit 14.

A first microprocessor unit 13 connecting to the first control chip set unit 12 to process signals of the first control chip set unit 12.

A first hard disk control unit 14 connecting to the first control chip set unit 12 to receive data from the LAN 150, and perform data access operation on the hard disk 40 after the access-grant is acquired, and has been connected to the path selection module 30 through a SATA interface.

The second SATA control module 200 aims to control data access of the hard disk 40 (such as reading or writing). The second SATA control module 200 includes:

a second network transmission unit 20 to connect the second SATA control module 200 to the LAN 150 to transmit or receive related data and control commands. The second network transmission unit 20 includes a second Ethernet port to link the LAN 150. The SAN system (not shown in the drawing) performs data management for the hard disk 40 through the LAN 150.

The second access-grant arbitration unit 21, connecting to the second network transmission unit 20 and the first access-grant arbitration unit 11, to determine the access-grant through the arbitration process, and generate a selection signal based on the process result. The first access-grant arbitration unit 11 and the second access-grant arbitration unit 21 are linked to the path selection module 30, to transmit the selected signal to the path selection module 30. The second access-grant arbitration unit 21 may be a field programmable gate array (FPGA) or a complex programmable logic device (CPLD), or other programmable planning logic elements.

A second control chip set unit 22 connecting to the second network transmission unit 20 to control circuit operation of the second network transmission unit 20 and a second hard disk control unit 24.

A second microprocessor unit 23 connecting to the second control chip set unit 22 to process signals of the second control chip set unit 22.

A second hard disk control unit 24 connecting to the second control chip set unit 22 to receive data from the LAN 150, and to access data on the hard disk 40 after the access-grant is acquired, and has been connected to the path selection module 30 through the SATA interface.

The path selection module 30 has a plurality of input ends and an output ends. The input ends are connected respectively to the first hard disk control unit 14 of the first SATA control module 100 and the second hard disk control unit 24 of the second SATA control module 200. The output end is connected to the hard disk 40. Furthermore, the path selection module 30 has a plurality of data transmission channels that are selectively switched according to selection signals to allow the SATA control module (first SATA control module 100 or second SATA control module 200), which has acquired the access-grant, to be connected to the hard disk 40 through different paths to read/write data. The path selection module 30 may include a multiplexer.

The hard disk 40 is connected to the path selection module 30 to provide a storage area to store data of the LAN system. It has a first generation SATA or second generation SATA interface.

Figure 2:
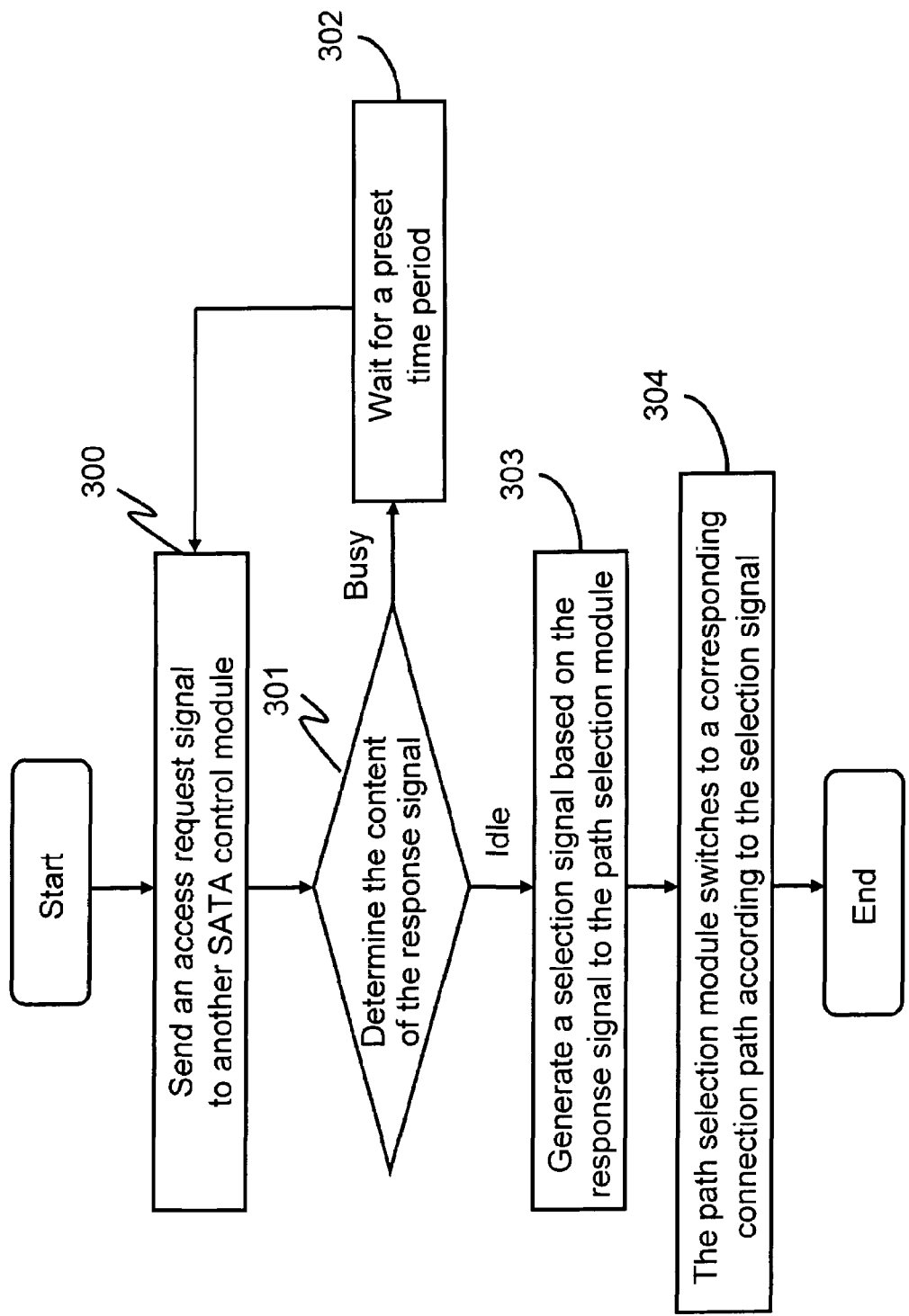
FIG. 2 is the process flowchart of the invention.

Refer to FIG. 2 for the process flow of the invention. First, the first SATA control module 100 and the second SATA control module 200 receive related data and access commands respectively through the first and second network transmission units (10, 20) to read/write data on the hard disk.

The first SATA control module 100 and the second SATA control module 200 determine access-grant through an arbitration process, which is explained by an example below. When the first SATA control module 100 receives data and controls commands, the first access-grant arbitration unit 11 issues an access request signal to the second access-grant arbitration unit 21 (step 300); the second access-grant arbitration unit 21 receives the signal and responds a condition signal according to the current condition.

Next, determine the content of the response signal (step 301); if the response signal indicates a busy condition, the first access-grant arbitration unit 11 waits for a preset time period (step 302). Then return to step 300.

If the second access-grant arbitration unit 21 responds a signal of an idle condition, it indicates that the second access-grant arbitration unit 21 does not precede data reading/writing operation on the hard disk 40 at that moment, the first access-grant arbitration unit 11 receives the responded idle signal and acquires the access-grant. Then generate a selection signal which is sent to the path selection module 30 (step 303) to switch the data transmission path, and proceed data reading/writing operation on the hard disk 40 in the next bus cycle. If the first SATA control module 100 and the second SATA control module 200 issue access request at the same time to each other, the access-grant is determined by a random process to grant one party, while the other party is waiting, and the arbitration process is finished.

The path selection module 30 switches the transmission path to the SATA control module acquiring the access-grant according to the received selection signal (step 304) to perform data transmission operation. The path selection module 30 may be a multiplexer.

The previous discussion is based on the first SATA control module 100, which receives related data and access commands. If the second SATA control module 200 receives related data and access commands, then the second access-grant arbitration unit 21 issues the access request to the first access-grant arbitration unit 11. The method for acquiring the access-grant is the same as the one previously discussed. Details are omitted.

Through the multi-channel SATA control system and the control card thereof, a single channel SATA control card can achieve a multi-channel access function. Through the access-grant arbitration units, data access operation is more efficient. Thereby the objects of multi-channel SATA data transmission and reducing SAN system cost can be achieved.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A multi-channel serial advanced technology attachment (SATA) control system to control data access of a hard disk, comprising:
   a first SATA control module to control the hard disk to perform data access operation;
   a first access-grant arbitration unit located in the first SATA control module;
   a second SATA control module connecting to the first SATA control module to control the hard disk to perform a data access operation;
   a second access-grant arbitration unit located in the second SATA control module to perform an arbitration process with the first access-grant arbitration unit, and generate a selection signal based on the result of the arbitration process; and
   a path selection module connecting to the first SATA control module and the second SATA control module, and switching data transmission paths according to the selection signal to allow the first SATA control module or the second SATA control module to control the data access operation of the hard disk,
   wherein the first SATA control module further includes:
   a first network transmission unit to provide a data transmission channel to connect to a local area network;
   a first hard disk control unit to perform the data access operation on the hard disk;
   a first control chip set unit to control operations of the first network transmission unit and the first hard disk control unit; and
   a first microprocessor unit to process signals of the first control chip set unit.

2. The multi-channel serial advanced technology attachment (SATA) control system of claim 1, wherein the first network transmission unit includes an Ethernet port.

3. The multi-channel serial advanced technology attachment (SATA) control system of claim 1, wherein the second SATA control module further includes:
   a second network transmission unit to provide a data transmission channel to connect to a local area network;
   a second hard disk control unit to perform the data access operation on the hard disk;
   a second control chip set unit to control operations of the second network transmission unit and the second hard disk control unit; and
   a second microprocessor unit to process signals of the second control chip set unit.

4. The multi-channel serial advanced technology attachment (SATA) control system of claim 3, wherein the second network transmission unit includes an Ethernet port.

5. The multi-channel serial advanced technology attachment (SATA) control system of claim 1, wherein the path selection module includes a multiplexer.

6. The multi-channel serial advanced technology attachment (SATA) control system of claim 1, wherein the first access-grant arbitration unit includes a field programmable gate array.

7. The multi-channel serial advanced technology attachment (SATA) control system of claim 1, wherein the first access-grant arbitration unit includes a complex programmable logic device.

8. A serial advanced technology attachment (SATA) control card to control data access of a hard disk, comprising:
   a network transmission unit to provide a data transmission channel to connect to a local area network;
   a hard disk control unit to receive data of the local area network to perform data access operation on the hard disk;
   a control chip set unit to control operations of the network transmission unit and the hard disk control unit;
   a microprocessor unit to process signals of the control chip set unit; and
   an access-grant arbitration unit to receive commands from the local area network and perform an arbitration process with another access-grant arbitration unit of another SATA control card to determine an access-grant to control the data access of the hard disk.

9. The serial advanced technology attachment (SATA) control card of claim 8, wherein the network transmission unit includes an Ethernet port.

10. The serial advanced technology attachment (SATA) control card of claim 8, wherein the access-grant arbitration unit includes a field programmable gate array.

11. The serial advanced technology attachment (SATA) control card of claim 8, wherein the access-grant arbitration unit includes a complex programmable logic device.

12. A multi-channel serial advanced technology attachment (SATA) control system to control data access of a hard disk, comprising:
- a first SATA control module to control the hard disk to perform data access operation;
- a first access-grant arbitration unit located in the first SATA control module;
- a second SATA control module connecting to the first SATA control module to control the hard disk to perform a data access operation;
- a second access-grant arbitration unit located in the second SATA control module to perform an arbitration process with the first access-grant arbitration unit, and generate a selection signal based on the result of the arbitration process; and
- a path selection module connecting to the first SATA control module and the second SATA control module, and switching data transmission paths according to the selection signal to allow the first SATA control module or the second SATA control module to control the data access operation of the hard disk, wherein the second SATA control module further includes:
- a second network transmission unit to provide a data transmission channel to connect to a local area network;
- a second hard disk control unit to perform the data access operation on the hard disk;
- a second control chip set unit to control operations of the second network transmission unit and the second hard disk control unit; and
- a second microprocessor unit to process signals of the second control chip set unit.

13. The multi-channel serial advanced technology attachment (SATA) control system of claim 12, wherein the first network transmission unit includes an Ethernet port.

14. The multi-channel serial advanced technology attachment (SATA) control system of claim 12, wherein the second network transmission unit includes an Ethernet port.

15. The multi-channel serial advanced technology attachment (SATA) control system of claim 12, wherein the path selection module includes a multiplexer.

16. The multi-channel serial advanced technology attachment (SATA) control system of claim 12, wherein the first access-grant arbitration unit includes a field programmable gate array.

17. The multi-channel serial advanced technology attachment (SATA) control system of claim 12, wherein the first access-grant arbitration unit includes a complex programmable logic device.

* * * * *